United States Patent
Beals et al.

(10) Patent No.: US 6,745,791 B2
(45) Date of Patent: Jun. 8, 2004

(54) SERVICE TOOLS FOR PIPELINES CONTAINING CONDUIT OR CABLE

(75) Inventors: Scott A. Beals, Los Angeles, CA (US); Ronald D. Hammer, Los Angeles, CA (US); Robert E. Evans, Pasadena, CA (US)

(73) Assignee: Sempra Fiber Links, San Diego, CA (US)

( * ) Notice: Subject to any disclaimer, the term of this patent is extended or adjusted under 35 U.S.C. 154(b) by 0 days.

(21) Appl. No.: 10/133,239

(22) Filed: Apr. 26, 2002

(65) Prior Publication Data
US 2003/0201011 A1 Oct. 30, 2003

(51) Int. Cl.$^7$ .................. F16L 55/128; F16L 55/13; F16K 31/44

(52) U.S. Cl. ................ 137/317; 137/15.08; 137/15.12; 138/89; 138/94

(58) Field of Search ..................... 137/15.12, 15.13, 137/15.14, 317, 318, 15.15; 138/97, 155, 89, 94; 254/134.3 R, 134.3 FT, 134.4; 388/100; 405/154.1, 155, 156, 157, 158, 159, 168.3, 174, 183.5, 184, 184.2, 184.4; 251/6, 9, 7, 8

(56) References Cited

U.S. PATENT DOCUMENTS

| | | | | |
|---|---|---|---|---|
| 2,842,331 A | * | 7/1958 | Anderson | 251/6 |
| 3,115,163 A | * | 12/1963 | Epps et al. | 138/94 |
| 3,335,753 A | * | 8/1967 | Kiser | 251/9 |
| 3,515,367 A | * | 6/1970 | Ziaylek, Jr. | 251/9 |
| 3,685,544 A | * | 8/1972 | Ball et al. | 138/89 |
| 3,872,880 A | * | 3/1975 | Ver Nooy et al. | 137/317 |
| 4,090,534 A | | 5/1978 | Martin et al. | |
| 4,232,981 A | * | 11/1980 | Lee | 405/154.1 |
| 4,369,813 A | * | 1/1983 | Thomas | 138/94 |
| 4,892,442 A | * | 1/1990 | Shoffner | 405/154.1 |
| 5,038,818 A | | 8/1991 | Jiles | |
| 5,044,393 A | | 9/1991 | Jiles | |

(List continued on next page.)

FOREIGN PATENT DOCUMENTS

EP 108 590 5/1984

OTHER PUBLICATIONS

T.D. Williamson, Inc., "Shortstopp II" Brochure, Feb. 1999.
T.D. Williamson, Inc., "Plugging and Completion Plug Systems" Brochure, Feb. 1999.
Gregor, Paul E., et al., *"Optical Fiber Cable Links Within Gas Pipelines as an Alternative Telecommunications Route Technology."* International Wire & Cable Symposium Proceedings, Dec. 1999.
Mustang Manufacturing, "DBML–80" Brochure, Mar. 1997.

Primary Examiner—George L. Walton
(74) Attorney, Agent, or Firm—Perkins Coie LLP

(57) ABSTRACT

Pipeline stopping tools for use in temporarily stopping flow in a pipeline have features for centering a conduit or cable within the pipeline. The conduit or cable is guided into a recess, to avoid damage as the pipeline is squeezed closed. Alternative pipeline stopping stools have features for sealing against both the inside walls of the pipeline and against the cable. In a first tool, a linkage on a handle drives seal lips on a seal ring to engage around and seal against the cable in the pipeline, while the outer edges of the seal ring seal against the inside walls of the pipeline. The linkage includes jaws which force the seal lips against the cable. In a second tool, a resilient seal is attached over a center plate and side plates pivotably attached to the center plate. A linkage drives the center plates from an open to a closed position. A cable recess in the seal ring seals against the cable while the outside edges of the seal ring seal against the pipeline. A third tool has a resilient plug and lips positioned around a cable recess. As the plug is forced into the pipeline, the lips seal around the cable, and the plug sidewalls bulge outwardly to seal against the pipeline.

18 Claims, 14 Drawing Sheets

U.S. PATENT DOCUMENTS

| | | |
|---|---|---|
| 5,052,431 A | 10/1991 | Jiles |
| 5,054,512 A | 10/1991 | Jiles |
| 5,143,353 A | 9/1992 | Sano et al. |
| 5,186,199 A * | 2/1993 | Murphy et al. ............... 138/94 |
| 5,358,010 A | 10/1994 | Jiles |
| 5,360,291 A * | 11/1994 | Shimizu ................. 405/154.1 |
| 5,531,250 A | 7/1996 | Freeman et al. |
| 5,577,528 A | 11/1996 | Saha et al. |
| 5,651,639 A | 7/1997 | Wentworth et al. |
| 5,690,139 A * | 11/1997 | Murphy et al. ............... 138/94 |
| 5,807,026 A | 9/1998 | Valette |
| 5,884,384 A | 3/1999 | Griffioen |
| 6,019,351 A | 2/2000 | Allen |
| 6,126,369 A | 10/2000 | Jiles |
| 6,130,975 A | 10/2000 | Eyres |
| 6,301,414 B1 | 10/2001 | Liese et al. |
| 6,341,188 B1 | 1/2002 | Serrander et al. |
| 2002/0114595 A1 | 8/2002 | Potash |
| 2003/0068143 A1 | 4/2003 | Martinez et al. |

\* cited by examiner

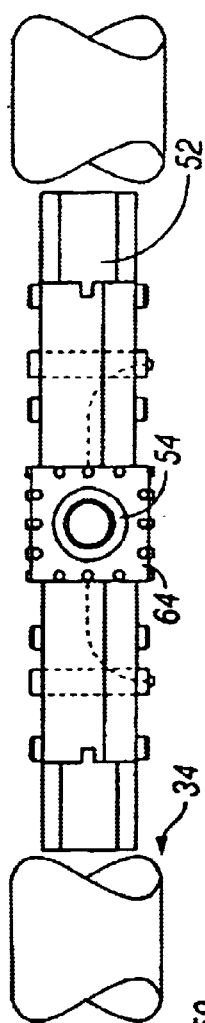
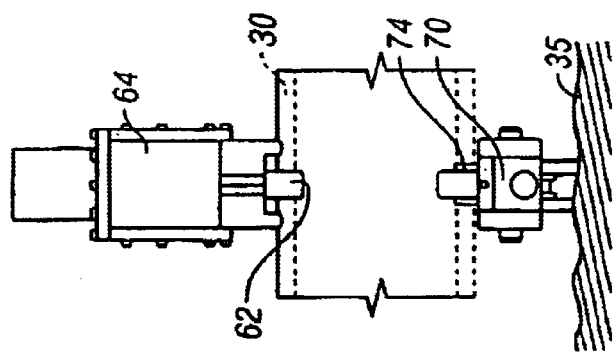
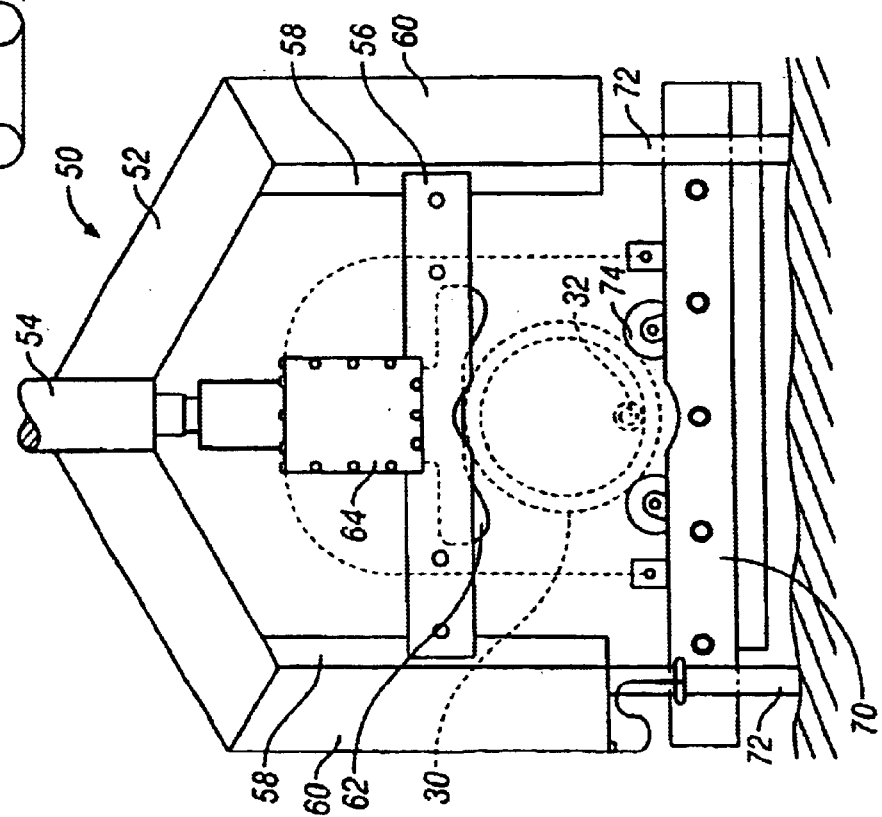

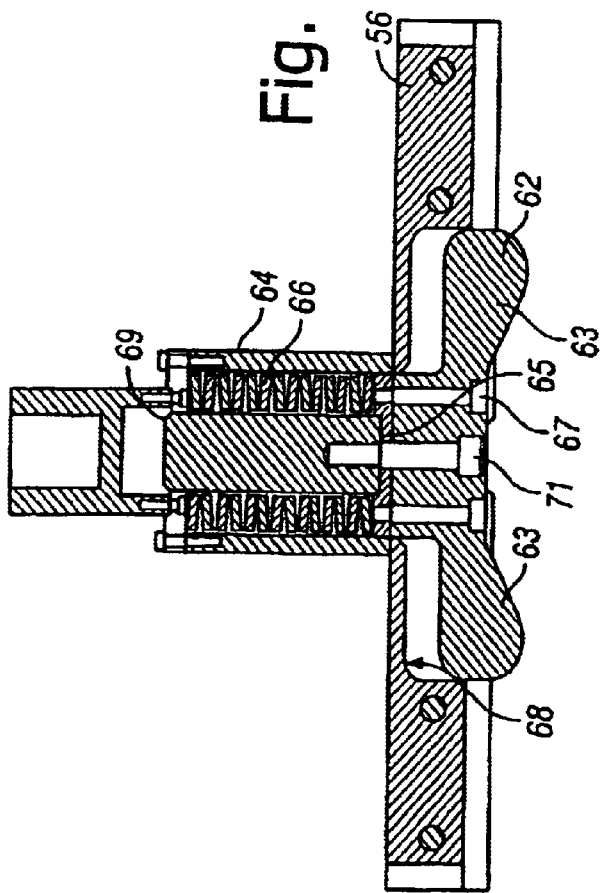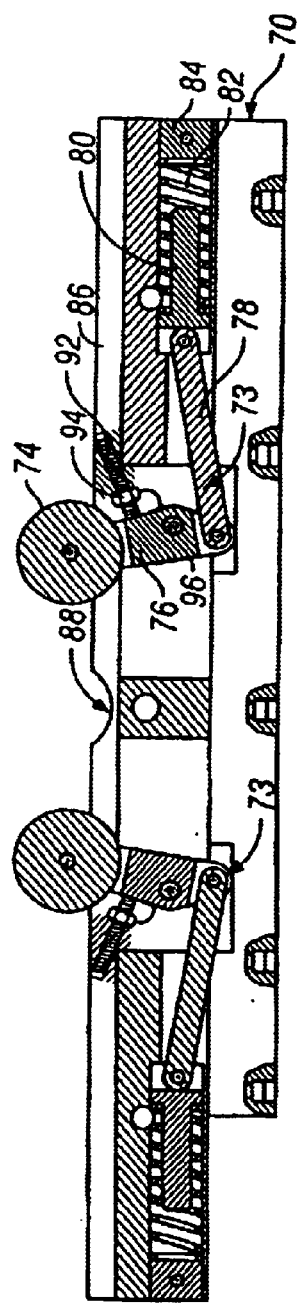

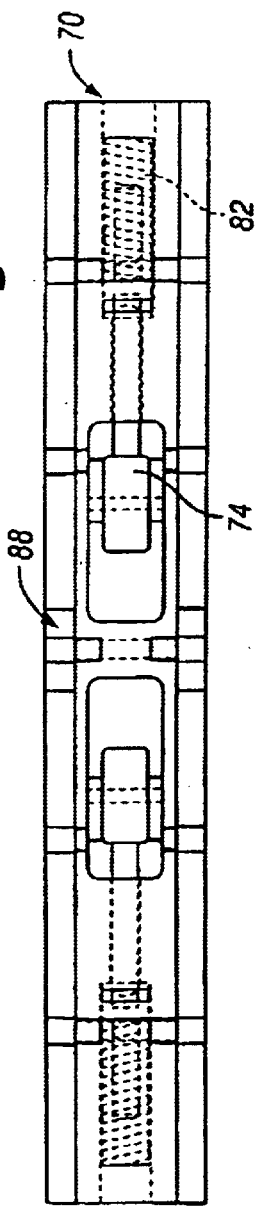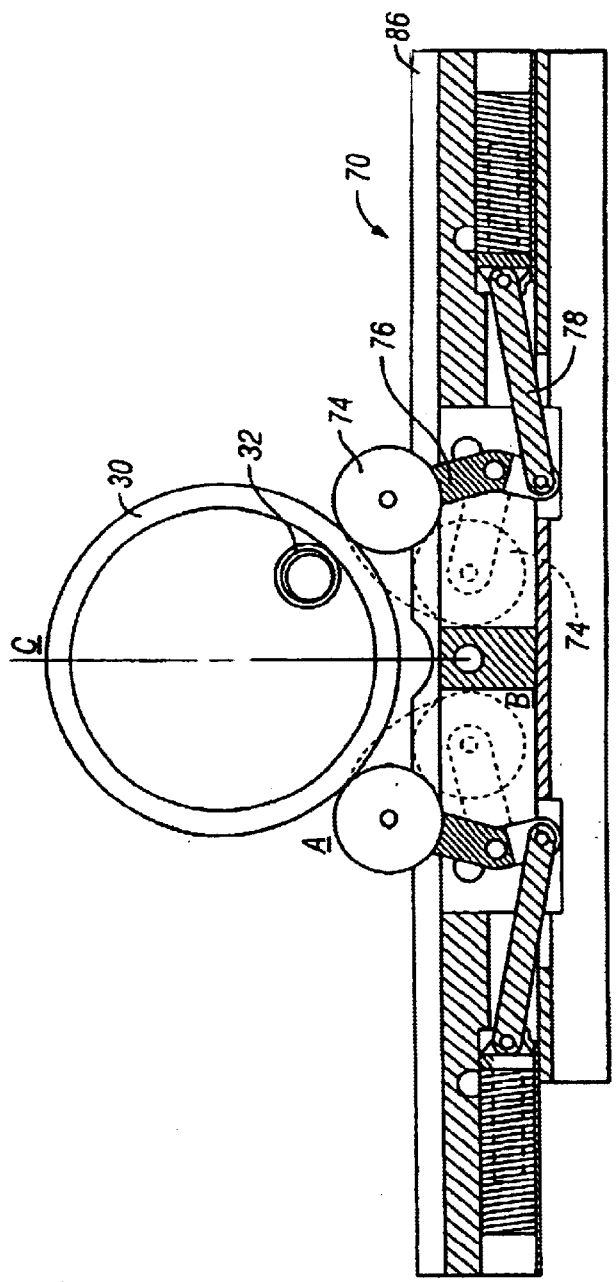

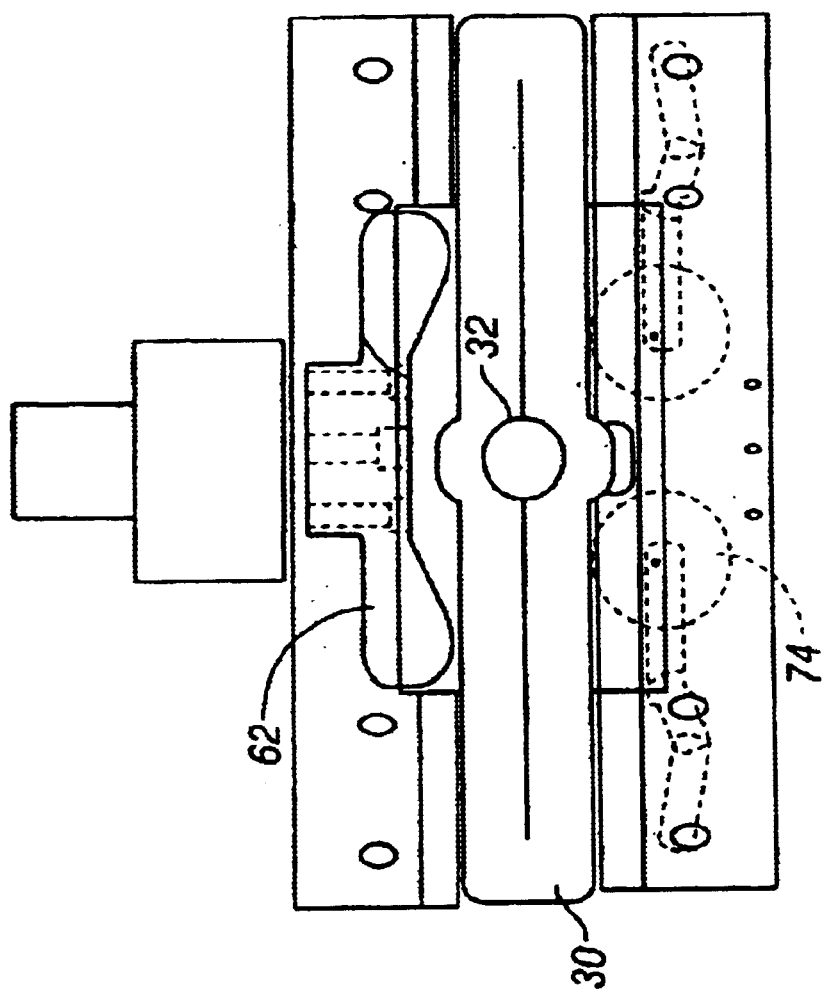

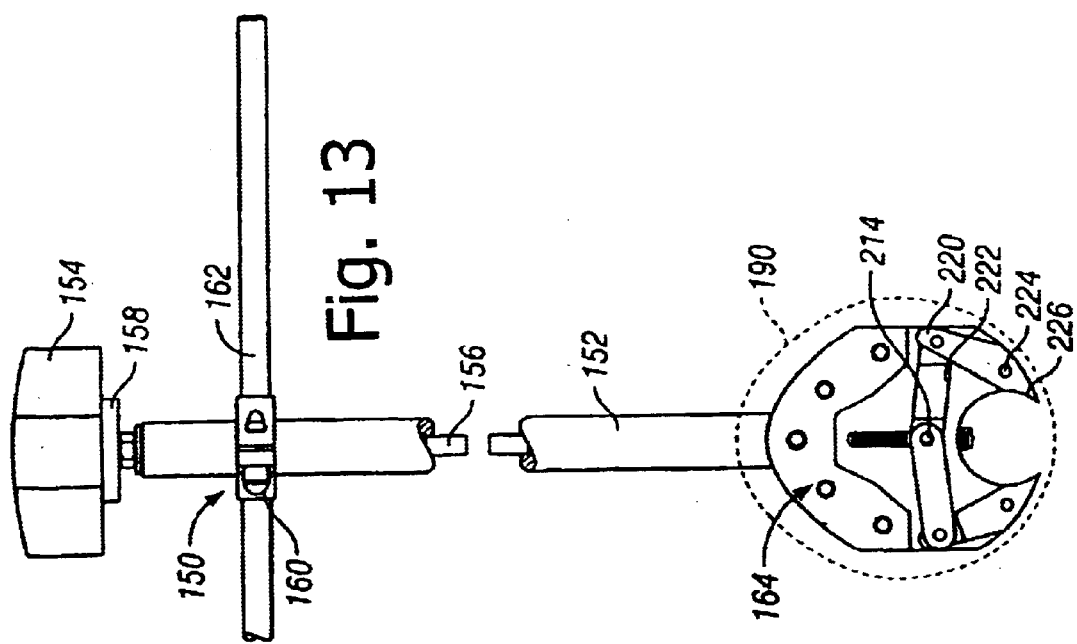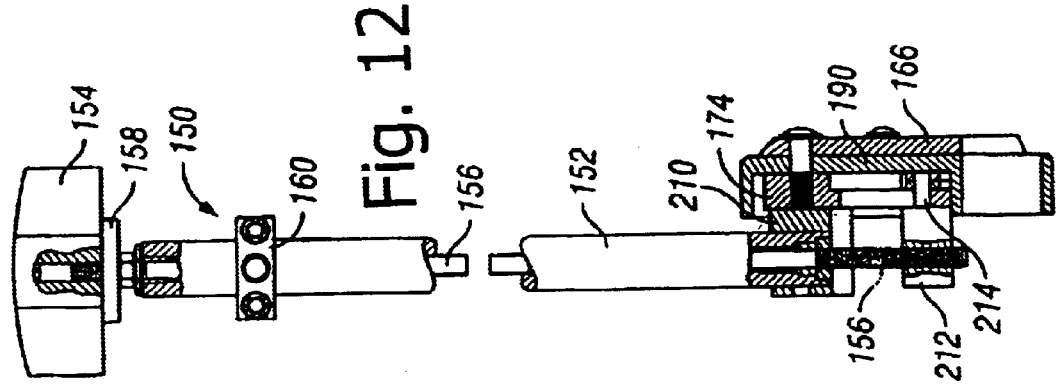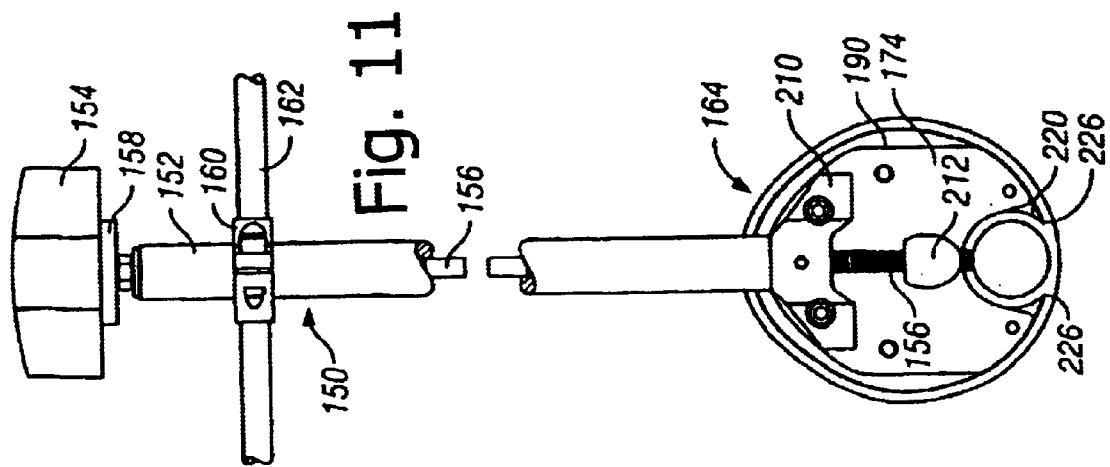

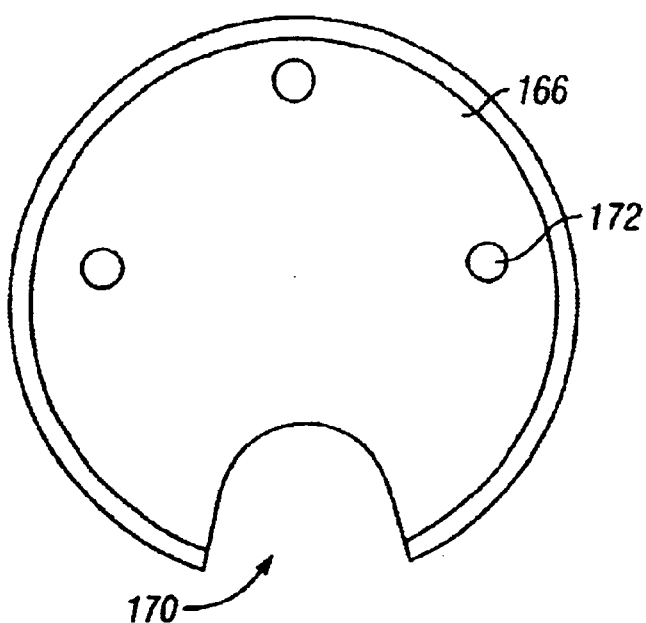
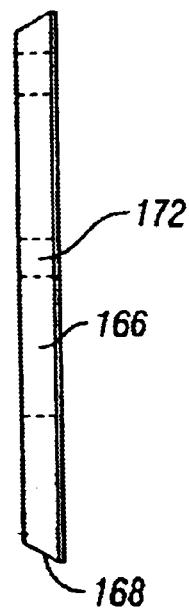
Fig. 14  Fig. 15
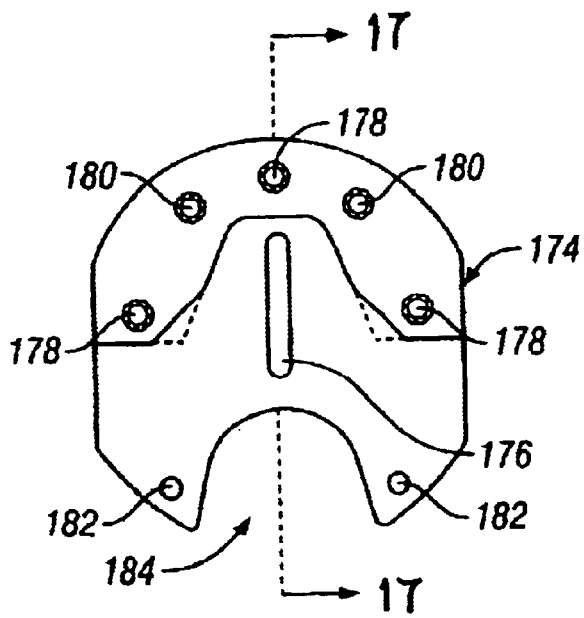
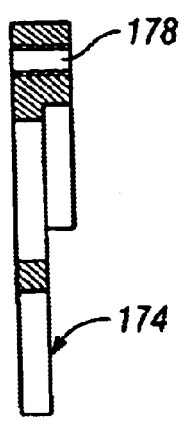
Fig. 16  Fig. 17

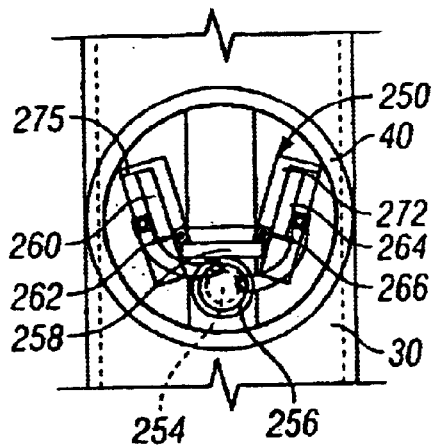
FIG. 25
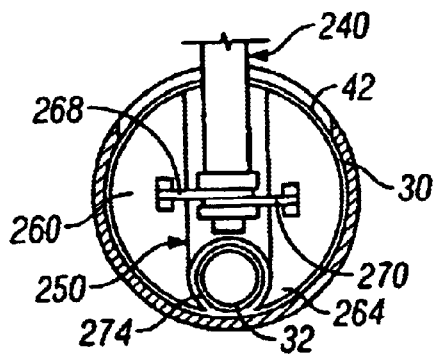
FIG. 26
FIG. 27
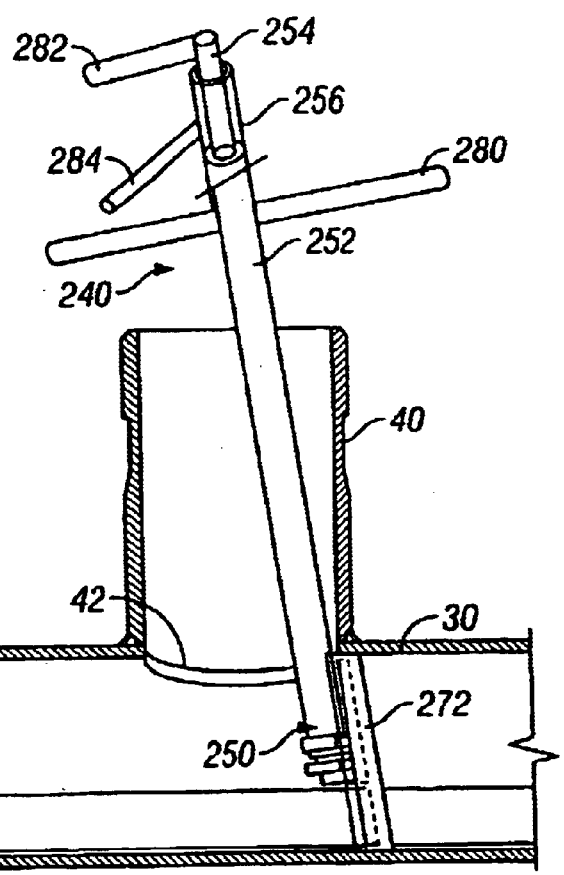
FIG. 28

SERVICE TOOLS FOR PIPELINES CONTAINING CONDUIT OR CABLE

BACKGROUND OF THE INVENTION

The field of the invention is tools and techniques for servicing pipelines. More specifically, the invention relates to tools and techniques for temporarily stopping flow in a pipeline.

Various tools and techniques have successfully been used in the past to stop flow of liquids or gases in pipelines. These tools are typically used to temporarily stop flow, to allow a downstream section of pipeline to be inspected, repaired, changed, or otherwise serviced. Such stopping or sealing tools are often used in emergency situations to stop flow within a localized section of pipeline, when flow cannot be quickly or easily stopped using existing valves in the pipeline. These tools are also used for planned operations or maintenance. In pipelines made of materials such as polyethylene, or similar plastics which can be deformed without damage, squeeze or pinch tools have been used to temporarily stop flow. These types of tools squeeze or pinch the pipeline flat to stop flow. When removed, the pipeline returns to its original or near original typically round shape, allowing flow to resume. For rigid or non-deformable pipelines, made of e.g., steel or iron, various stopping or plugging tools have been used. Some of these stopping or plugging tools can also be used with plastic pipe if the pinch method is not desired. With these tools, typically an opening is cut or drilled into the pipeline through a pressure housing. The stopping tool then installs a plug or similar stopping element into the pipeline to stop flow. The stopping element is removed when service is complete, allowing flow to resume. Leakage of gas or liquid from the pipeline during the stopping operation is minimized or eliminated via the pressure housing.

As described in International Patent Application PCT/US/01/31468, incorporated herein by reference, fiber optic conduit or cable may be advantageously installed within existing pipelines, to provide high speed communication links, without the need for routing cable or conduit along new right of ways or without the drawbacks of new underground conduit installation.

Placing fiber optic cable or conduit within existing natural gas pipelines has recently become much more viable, with the development of systems and methods for installing the cables while the pipeline remains in service. Especially in urban areas where trenching to lay cable is difficult, time consuming, and costly, and where virtually all buildings are already connected to a natural gas pipeline network, the use of fiber optic cable within natural gas pipelines has many advantages.

However, existing tools and techniques used for stopping flow in a natural gas pipeline are not usable for pipelines containing a cable. With the cable or conduit laying on the bottom of the pipeline, the stopping or sealing elements currently in use cannot achieve an effective seal within the pipeline (since the flow area inside the pipeline is no longer a circular cross section). In addition, regardless of the lack of effective sealing characteristics, use of existing stopping or sealing tools and techniques in pipelines containing a cable involves significant risk of crushing, severing or otherwise damaging the cable.

Accordingly, with the introduction of cable into pipelines, there is a need for flow stopping tools and techniques, which are compatible with a cable or conduit in the pipeline.

BRIEF STATEMENT OF THE INVENTION

The invention provides tools and techniques for stopping flow in a pipeline containing a cable. The tools may be used on pipelines above ground, or with minimum trenching and exposure of buried pipelines. The tools provide an effective seal within the pipeline, stopping flow, without damaging the cable in the pipeline. The tools may be used at any location along pipeline. Generally, each tool seals against the inside round walls of the pipeline, and also around the outside of the cable.

In a first aspect, a tool for pinching off flow of gas through a deformable or plastic pipeline includes an actuator on an armature. The actuator moves an upper plate towards a lower plate. Displacement members on the lower plate help to guide the cable within the pipeline into a recess in the lower plate. This allows the pipeline to be squeezed flat to stop flow, without crushing the cable. The displacement members are preferably rollers or lever arms. The displacement members are advantageously urged into an up or extended position by springs.

In a second aspect, a tool for sealing off gas flow, in a rigid (e.g., steel) pipeline, or in a deformable or plastic pipeline containing a cable, has a seal ring on a handle. A linkage on the handle drives seal lips on the seal ring to engage around and seal against the cable within the pipeline. The outside circular edges of the seal ring seal against the inside walls of the pipeline. Preferably, the drive linkage includes jaws engaged with the seal lips. A rod advantageously extends through the handle and is connected to the jaws, for remote operation of the jaws.

In a third aspect of the invention, a stopper tool for use in a pipeline containing a cable or conduit has first and second plates pivotably attached to a center plate. A resilient seal ring overlies the first, second and center plate. A linkage pivots the first and second plates from an open position, where the first and second plates are oriented at an angle to the center plate, to a second position where, the first and second plates generally lie within the same plane as the center plate. The tool is installed into the pipeline with the plates in the first position. Once appropriately located within the pipeline, the first and second plates are pivoted into the second position, creating a seal within the pipeline.

In a fourth aspect of the invention, a pipeline flow stopper tool has a resilient plug including first and second lips positioned to fit over a cable within a pipeline. As the plug is pushed into the pipeline, the plug deforms and seals against the pipeline walls. The first and second lips extend around and under the cable, forming a continuous seal around the cable within the pipeline.

Other and further objects and features will become apparent from the following detailed description. The invention resides as well in subcombinations of the assemblies, components and steps described. Each of the tools described is intended for use in a pipeline having a specific inside diameter of e.g., 5–100 cm. Consequently, typically tools including any of the aspects described above will be available in a range of sizes. The tools are also intended for use with a cable or conduit of a known and specified diameter within the pipeline.

It is an object of the invention to provide tools and techniques for stopping flow within a pipeline containing a cable or conduit.

BRIEF DESCRIPTION OF THE DRAWINGS

FIG. 2 is a front view of a first embodiment of the invention for use with deformable or collapsible pipelines, such as polyethylene.

FIG. 3 is a top view of the tool shown in FIG. 2.

FIG. 4 is a side view of the tool in shown in FIG. 2.

FIG. 5 is a section view of the top plate assembly shown in FIG. 2.

FIG. 6 is a section view of the bottom plate assembly shown in FIG. 2.

FIG. 7 is a top view of the bottom plate assembly shown in FIGS. 2 and 6.

FIG. 8A is a side view, in part section of the bottom plate assembly shown in FIGS. 2 and 6, with the pipeline shown before pinching.

FIG. 9 is a view similar to FIG. 8, shown with the pipeline pinched closed.

FIG. 11 is a left side view of another tool for stopping flow in a pipeline containing a cable.

FIG. 12 is a partial section view of the tool shown in FIG. 11.

FIG. 13 is a right side view of the tool shown in FIGS. 11 and 12, with the seal ring removed for purpose of illustration.

FIG. 14 is a front view of the front plate of the tool shown in FIG. 12.

FIG. 15 is a side view thereof.

FIG. 16 is a front view of the rear plate shown in FIGS. 11 and 12.

FIG. 17 is a section view taken along line 17—17 of the FIG. 16.

FIG. 25 is a top view of an alternative flow stopping tool, for use in a rigid pipeline containing a cable, and showing the tool in an open position.

FIG. 26 is a top view of the tool shown in FIG. 25, in the closed position.

FIG. 27 is a front view of the tool shown in FIG. 26.

FIG. 28 is a side view of the tool shown in FIGS. 26 and 27.

DETAILED DESCRIPTION

Figure 1:
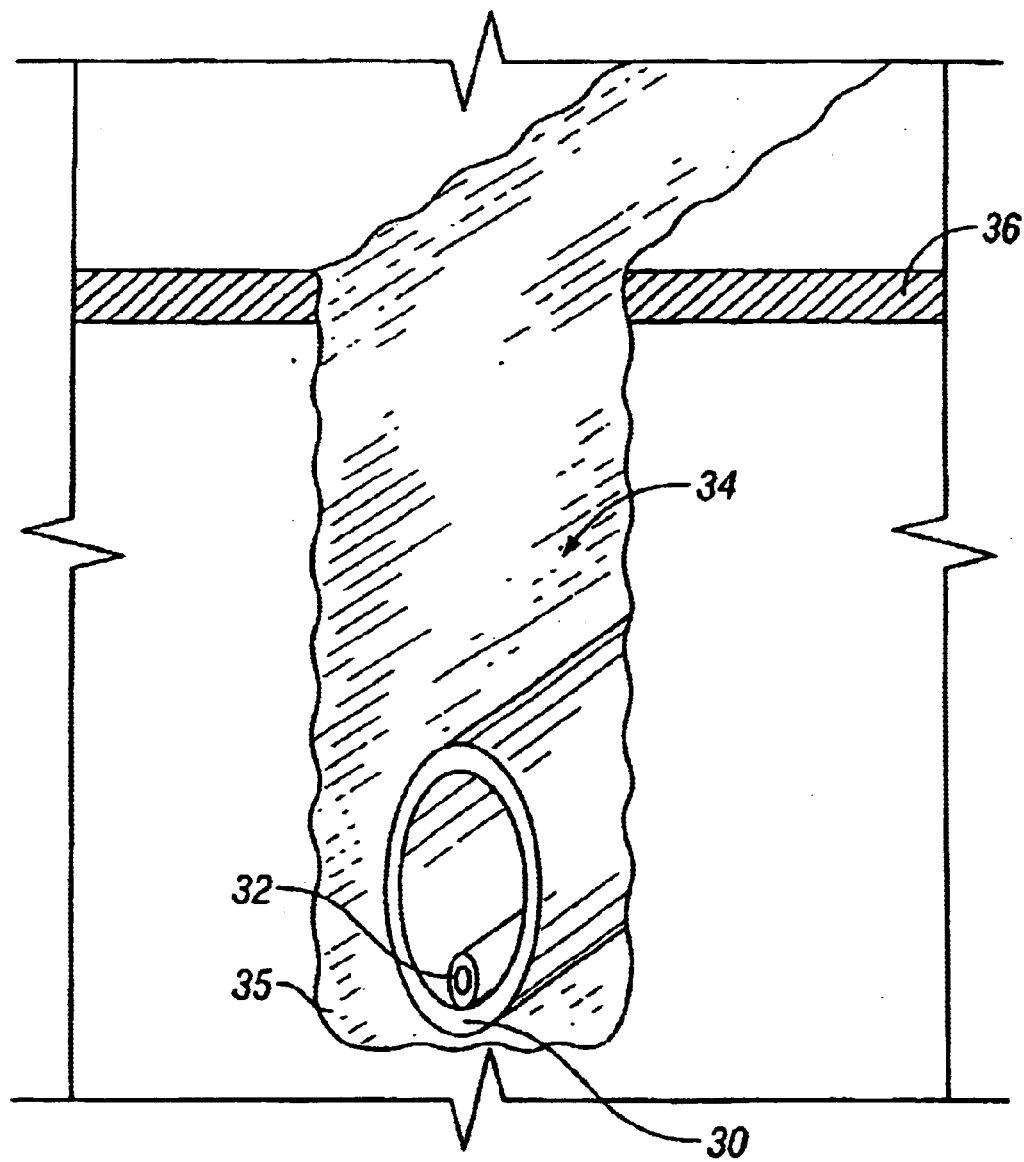
FIG. 1 is a perspective view of a pipeline in a trench, with a cable within the pipeline.

Turning now in detail to the drawings, as shown in FIG. 1, a pipeline 30 containing a conduit or cable 32 rests on the bottom 35 of a trench 34. The term conduit or cable means a conduit, cable, duct, pipeline, or other lumen, which may or may not contain optical fibers, copper wires or other lines.

Turning to FIGS. 2, 3 and 4, where the pipeline 30 is a squeezable or deformable material, such as polyethylene, a pincher tool 50 may be used to stop flow within the pipeline 30, without damaging the cable 32 contained in the pipeline 30.

As shown in FIG. 2, the pincher tool 50 has an armature 52 including side arms 60. A top plate 56 is vertically movable along guide rails 58 on the armature side arms 60. An actuator 54 attached to the armature 52 is joined to a spring housing 64 on the top plate 56. Referring to FIGS. 2 and 5, a centering plate 62 having side lobes 63 is attached to a spring plate 65 via plate bolts 67. The centering plate 62 is also attached to center plunger 69 by a plunger bolt 71. A centering plate spring 66 surrounding the center plunger 69 is attached the spring plate 65, and to the spring housing 64. The centering plate 62 according can move up into a plate recess 68 in the top plate 56, as force acting on the centering plate 62 compresses the spring 66.

Turning to FIGS. 6, 7, and 8A, a pinch plate 86 on the bottom plate assembly 70 has a centrally located plate recess 88. Left and right side roller assemblies 73 are spaced apart on opposite sides of the plate recess 88. The roller assemblies 73 are preferably identical, and the bottom plate assembly 70 is preferably symmetrical side to side about the centrally located a plate recess 88. The following description of the right side roller assembly 73 shown in FIG. 6 applies as well to the left side roller assembly in FIG. 6.

A roller 74 is rotatably supported on a roller arm 76 pivotably attached to the pinch plate 86 on a roller arm pivot pin 96. A roller link 78 extends from the end of the roller opposite the roller 74 to a spring hub 80. A roller spring 82 around the spring hub 80 is contained on or in the bottom plate assembly 70 by a spring stop 84. The spring 82 urges the spring hub 80 to the left in FIG. 6, holding the roller 74 in an upright position. A stop nut 94 on a roller arm stop 92 is adjustable to set the up position of the roller 74.

Figure 8B:
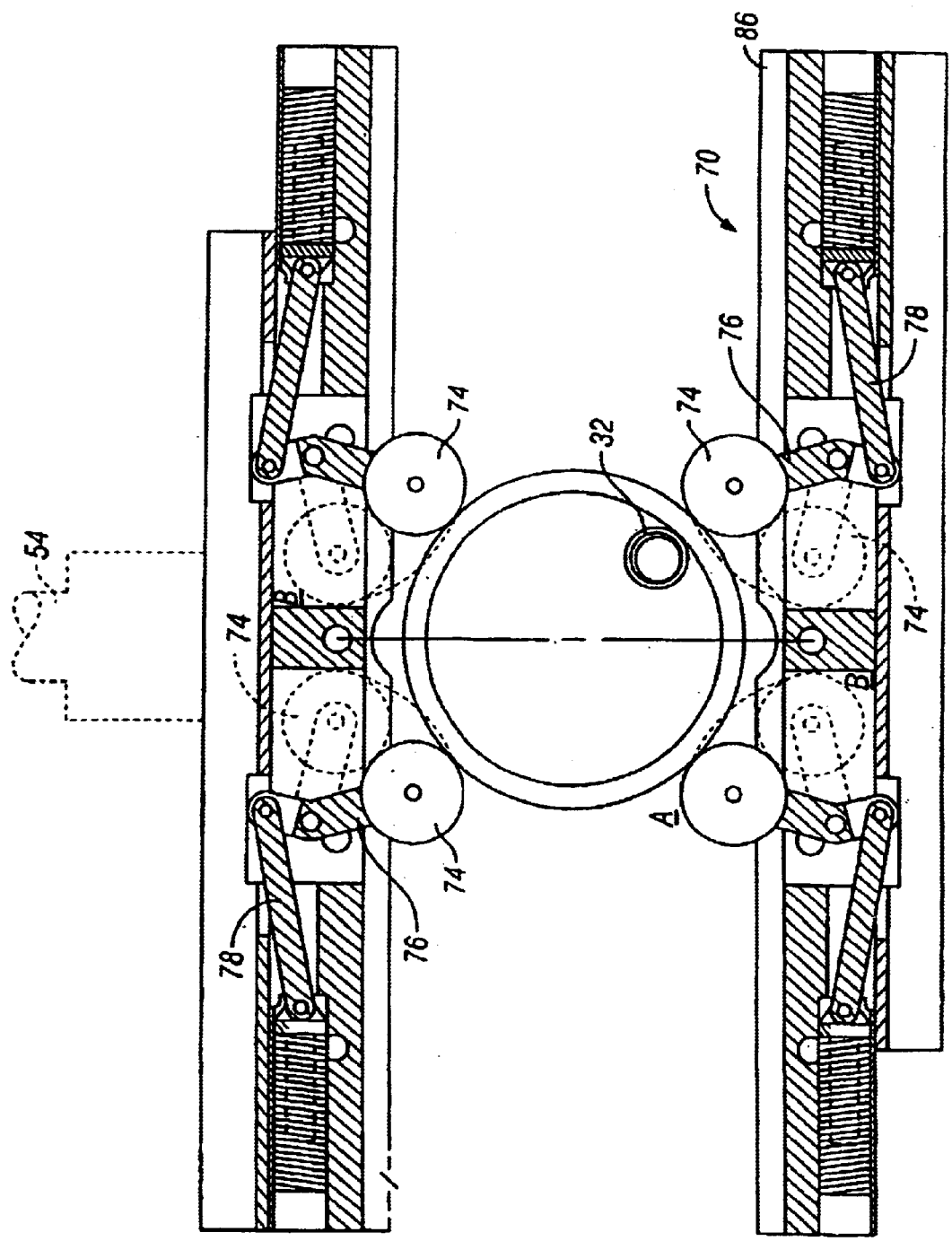
FIG. 8B is a side view, in part section, of an alternative tool, similar to the tool shown in FIG. 8, and with top and bottom rollers.

Optionally, a single spring acting on both rollers may be used. The roller assemblies 73 can also be used on the top plate 56, as shown in FIG. 8B, in place of the centering plate 62.

The tool 50 is used to pinch the pipeline 30 closed, to stop flow (e.g., of natural gas) through the pipeline. This allows a down stream section of the pipeline to be opened up for inspection, maintenance, service, expansion, etc. If the pipeline 30 is buried, a hole or trench 34 is excavated around the pipeline. The bottom plate assembly 70 is then separately installed under the pipeline, with the pipeline resting on the rollers 74. The armature 52 is then brought down over the pipeline. The centering plate 62 in the extended position shown in FIG. 2. The bottom plate assembly 70 is connected to the armature 52 by plate bolts or posts 72. The tool 50 and pipeline 30 are then position as shown in FIG. 2.

The actuator 54 is extended, driving the top plate 56 down towards the bottom plate assembly 70. The actuator 54 may be a hydraulic or pneumatic actuator. Alternatively, the actuator 54 may be a manually operated actuator, such as a jacking screw, hand pumped hydraulic jack, etc. The size, material and wall thickness of the pipeline 30, which determines the compressive force needed to squeeze the pipeline shut, will also determine, at least in part, the type, size and number of actuators needed. Various size or models of tools are preferably used for different size pipes. Each model of tool preferably has pressure relief and bar stops to prevent over-compression, as is well known in the pipeline tool industry.

As the top or pinch plate 56 is driven down by the actuator 54, the pipeline 30 begins to squeeze closed. The centering plate 62 moves up into the spring housing 64, compressing the centering plate spring 66. The rollers 74 begin to move down, from position A, to position B, in FIG. 8. As the pipeline 30 is pinched, the lobes 63 of the centering plate 62 compress the pipe such that the conduit 32 is urged towards the vertical center line C of the pipeline 30. The rollers 74, acting from below, similarly urge the conduit to the center position, so that when the pipeline 30 is fully pinched flat, the conduit rests in the plate recess 88 and is not damaged, and full flow stoppage is achieved. The tool in FIG. 8B operates in a similar way. The tools in FIGS. 8A and 8B both automatically center the conduit/cable no matter where the conduit is laying in the pipe. Centering the conduit allows for gas shut off without damaging the cable/conduit.

FIG. 9 shows the pipeline 30 completely pinched closed. The cable 32 within the pinched pipeline 30 rests within the plate recess 88 on the pinch plate 86. The rollers 74 are flush with the top surface of the pinch plate 86.

The pipeline 30 remains in the pinched position shown in FIG. 9, with gas flow through the pipeline stopped, until after the downstream pipeline operations (inspection, maintenance, service, repair, etc.) are completed. The actuator 54 is then reversed, lifting the top plate 56 up. The rollers 74 return to the up position shown in FIG. 2. The pipeline 30 gradually returns to its original round shape, allowing unimpeded gas flow. The plate bolts 72 are removed and the armature 52 withdrawn. The bottom plate assembly 70 is removed from underneath the pipeline 30. The excavation or trench 34 around the pipeline 30 is then filled in.

Figure 10:
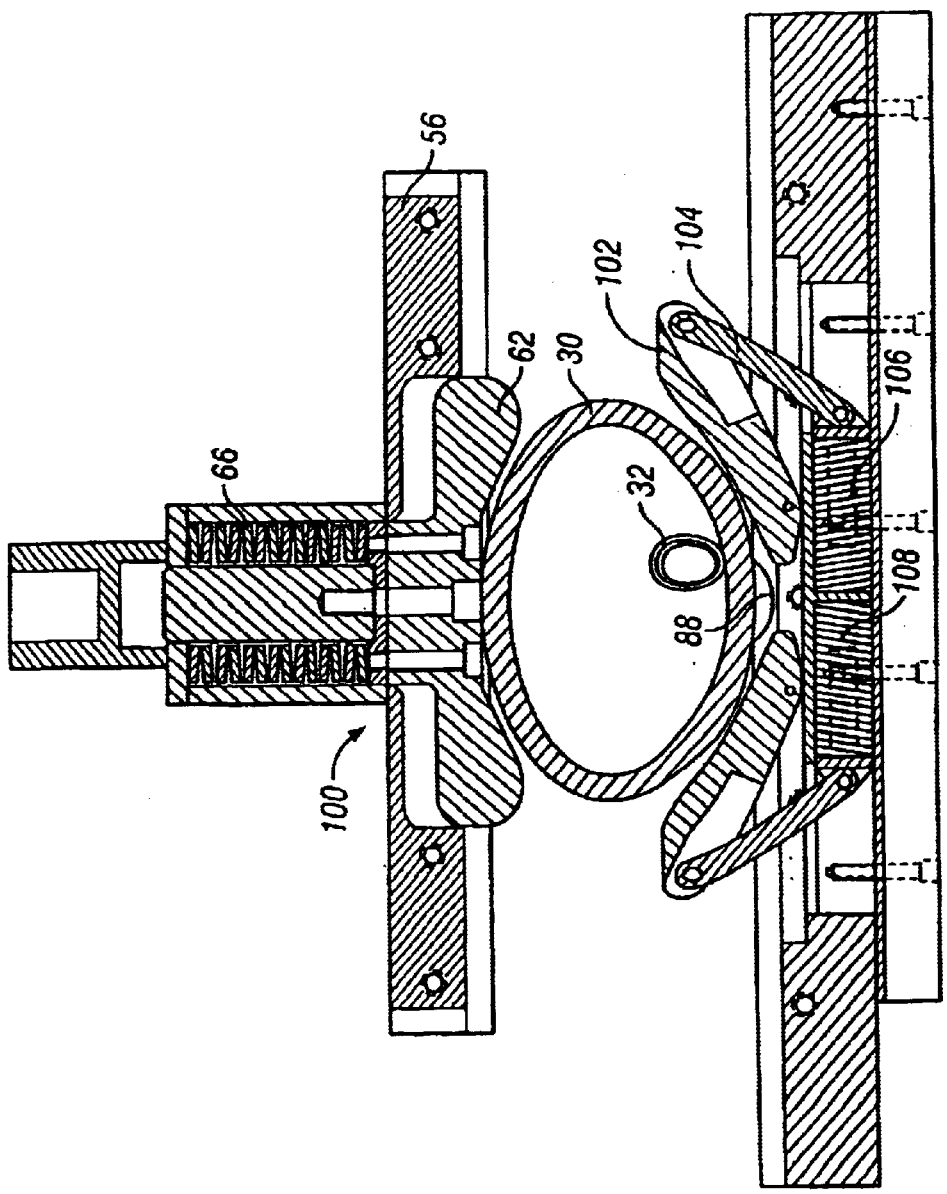
FIG. 10 is a section view of an alternative pipeline pinching tool.

FIG. 10 shows a pipeline pinching tool 100 similar to the tool 50 described above. However, the tool 100 has pipeline levers 102 instead of the rollers 74. The levers 102 are spring biased into the up position shown in FIG. 10 by springs 108 acting outwardly on spring hubs 106 and lever links 104. The pipeline levers 102 act as displacement members, in the same way as the rollers 74 described above. Other forms of displacement members, including single members such as troughs, v-channels, etc. may also be used.

Existing tools currently in use for pinching pipelines without a conduit or cable have an armature 52, an actuator 54, and flat upper and lower plates. For use with pipelines containing a conduit or cable, these types of tools can be retrofit with plates having the cable centering features shown in FIGS. 2–9. The plates 56 and 70 (along with the components on them, as shown e.g., in FIGS. 5 and 6) can be provided as inserts or kit parts for use in these known pipeline squeezing tools. When provided as inserts, the features shown in FIGS. 2–9 can be used with commercially available pinch tools or machines, such as those from Mustang Manufacturing, Carson City, Nev., USA. The advantage of this approach primarily stems from the benefit of using existing machines already owned by the pipeline operator. Training and documentation for existing equipment can largely be used as is, thus reducing overall expense of the operation. Furthermore, manufacturing costs of the inserts are less compared to fabrication of a custom machine used specifically for this purpose. Since the Insert design automatically centers the conduit/cable for an advantageous closure of the pipe with damage to the conduit or cable, the existing procedures used with existing pinching machines can also be used when such machines are fitted with the inserts having cable centering features or devices.

Turning now to FIGS. 11, 12 and 13, a tool 150 primarily intended for stopping flow within a rigid pipeline (but also be usable in plastic pipelines), has a thrust bar 162 attached to a handle 152 by a thrust collar 160. A pipe plug assembly generally designated as 164, is attached to the lower end of the handle 152. The pipe plug assembly has a back plate 174 attached to the handle 152 by a handle bracket 210. A front plate 166 holds a resilient seal ring 190 against the back plate 174. As shown in FIGS. 14 and 15, the front plate 166 has a conduit recess 170, a bevel edge 168, and mounting holes 172. Referring to FIGS. 16 and 17, the back plate 174 also has a conduit recess 184 generally matching the size and shape of the conduit recess 170 in the front plate 166. The back plate 174 includes a rod slot 176, plate mounting holes 178 matching the pattern of the mounting holes 172 in the front plate 166, pivot pin holes 182, and bracket mounting holes 180.

Figure 18:
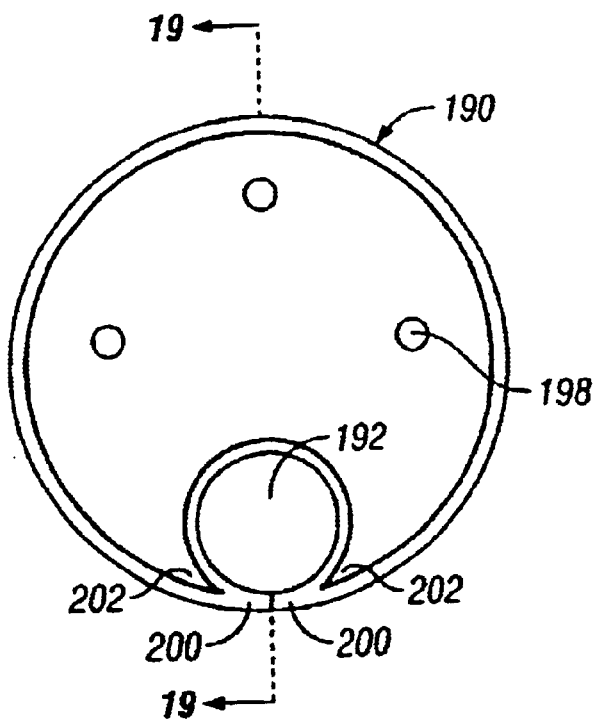
FIG. 18 is a front view of the seal ring shown in FIG. 12.
Figure 19:
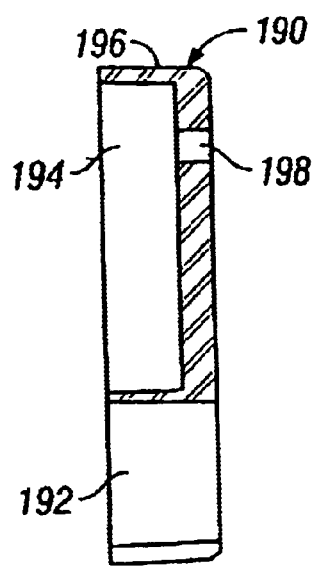
FIG. 19 is a section view taken along line 19—19 of the FIG. 18.
Figure 20:
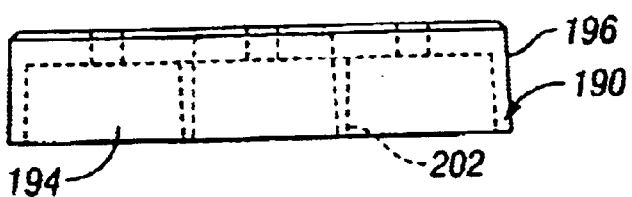
FIG. 20 is a top view of the seal ring shown in FIG. 18.

Referring to FIGS. 18, 19 and 20, the seal ring 190, preferably made of a resilient material, such as rubber, has a tapered outer cylindrical wall 196 dimensioned to seal with the inside walls of the pipeline 30. A split conduit opening or recess 192 extends through the seal ring 190, preferably at a bottom center or 6 o'clock position. Seal lips 200 at the bottom of the split conduit opening 192 are ordinarily in contact with each other. A jaw slot 202 is formed between the inside surface of the cylindrical walls 196 and the smaller diameter cylindrical walls of the conduit opening 192. Mounting holes 198 through the seal ring 190 align with the plate mounting holes 178 and 172. Referring to FIG. 12, the back plate 174 fits within a back plate recess 194 in the seal ring 190. Screw fasteners extend through the mounting holes 198, 178, and 172, holding the front plate 166, the seal ring 190, and the back plate 174 together.

Referring to FIGS. 11, 12 and 13, a clamp rod 156 extending through the handle 152 is joined to a rod arm 212 having a rod arm pin 214 extending through the rod slot 176 in the back plate 174. At the top end of the tool 150, a clamp knob 154 is attached to the upper end of the clamp rod 156. The clamp knob and rod are rotatable relative to the handle 152, on a knob plate 158. Referring to FIG. 13, wherein the seal ring 190 is removed for purpose of illustration, left and right side jaws 220 are pivotably attached on jaw pivot pins 224 on the back plate 174. A jaw link 222 connects the upper end of each jaw 220 to the rod arm pin 214.

Figure 21:
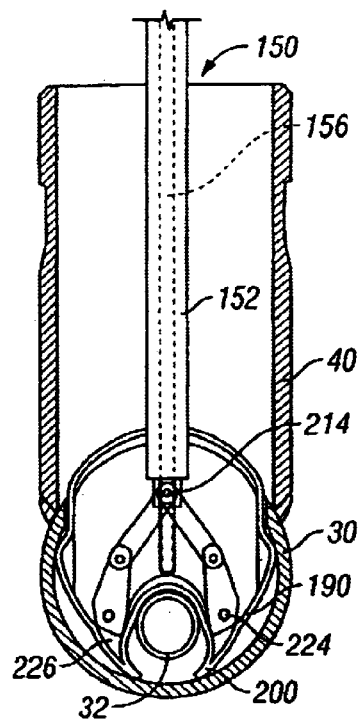
FIG. 21 is a front view showing the tool of FIG. 12 in an open position.
Figure 22:
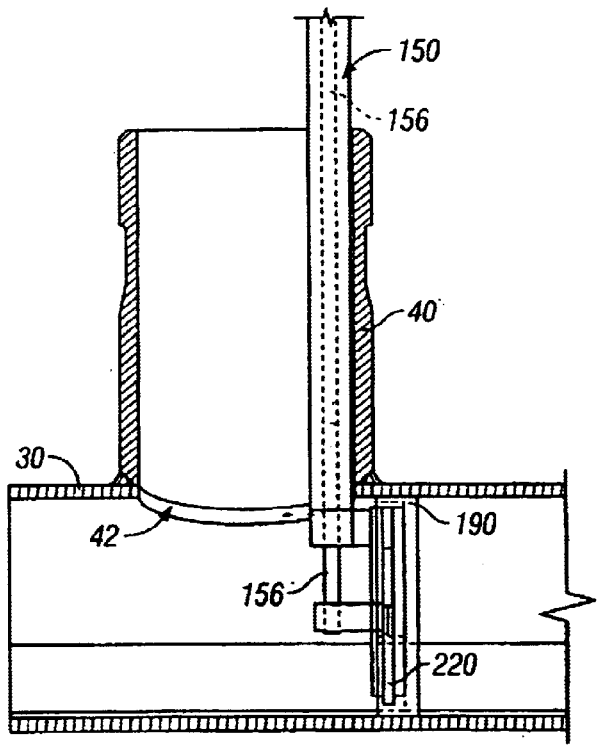
FIG. 22 is a side view showing the installation of FIG. 21.
Figure 23:
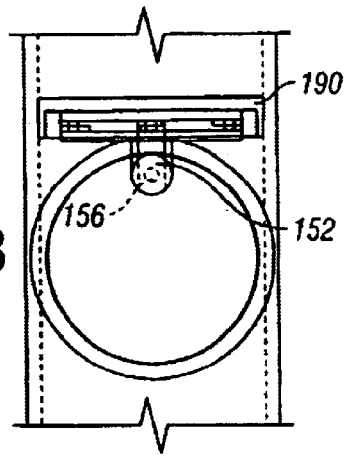
FIG. 23 is a top view thereof.

In use, the tool 150 is placed into a pipeline 30 through an access fitting 40, as shown in FIG. 22. The clamp knob 154 is positioned or turned so that the clamp rod 156 is pulled up. The jaws 220 and jaw links 222 are open, as shown in FIG. 21. The seal lips 200 of the seal ring 190 are pulled apart, allowing the conduit opening 192 to fit over the conduit 32, as shown in FIG. 21. The resilient seal ring 190 is deformed, as shown in FIG. 21. With the pipe plug assembly 164 in the open position, spaces are present between the pipe plug assembly 164 and the inside walls of the pipeline 30. Accordingly, with the tool 150 in the position shown in FIG. 21, flow continues past the pipe plug assembly 164. The tool 150 is maneuvered using the handle 152 and the thrust bar 162, to position the pipe plug assembly 164 into the pipeline 30, as shown in FIG. 22, with the jaws 220 in the open position shown in FIG. 21. The deformed shape of the seal ring 190 allows the pipe plug assembly 164 to be more easily installed into position, as clearance spaces are provided between the deformed (non-round) edges of the seal ring 90 and the pipeline inner walls.

Figure 24:
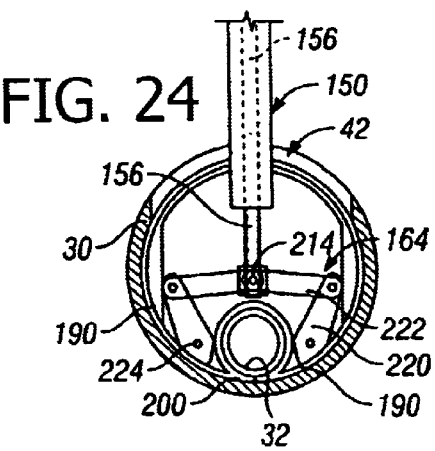
FIG. 24 is a front view showing the tool of FIG. 21 in the closed position.

Once the plug assembly 164 is in place, the clamp knob 154 is turned to drive the rod arm 212 down. As the rod arm 212 moves down, the rod arm pin 214 causes the lower ends of the jaw links 222 and the upper ends of the jaws 220 to move apart. As a result, the jaws 220 pivot about the pivot pins 224. The lower pointed ends 226 of the jaws 220 drive the seal lips 200 together, and clamp the conduit opening 192 of the seal ring 190 around the conduit 32. As this occurs, the seal ring 190 moves from the deformed position shown in FIG. 21 to the circular position shown in FIG. 24. The tapered cylindrical outer wall 196 of the seal ring 190 then seals against the inner walls of the pipeline 30. The upstream side of the wall 196 has a diameter slightly more than the downstream side. Flow through the pipeline 30 is stopped, without damaging the table 32.

The tool 150 is installed within a pressure housing or fitting attached to the access fitting 40, to prevent gas leakage from the pipeline 30, as is well known in pipeline technology. The tool 150 is removed by turning the clamp knob 154 in the reverse direction, thereby returning the jaws 220 back to the position shown in FIG. 21. The tool 150 can then be pulled up and out of the pipeline 30.

Turning to FIGS. 25, 26, 27 and 28, an alternative pipeline stopper tool 240 has a pipe plug assembly 250, including folding components. As shown in FIGS. 25 and 27, a center handle plate 258 is attached to a tubular handle 252. First and second side plates 260 and 264 are attached to opposite sides of the center handle plate 258 via first and second hinge joints 262 and 266. First and second links 268 and 270 are pivotably attached to the first and second side plates 260 and 264, respectively, and to a first or inner and a second or outer tube 254 and 256 concentrically positioned within the handle 252. A resilient seal ring 272 is positioned over the center handle plate 258 as well as the first and second side plates 260 and 264. A conduit recess 274 extends through the seal ring 272 at a bottom center position.

As shown in FIG. 28, a thrust bar 280 is attached to the handle 252. Inner and outer tube handles 282 and 284 are attached respectively to the inner and outer tubes 254 and 256. Pivoting movement of the inner tube 254 via the inner tube handle 282 causes the second side plate 264 to pivot relative to the center handle plate 258. Correspondingly, pivoting movement of the second or outer tube 256 via the outer tube handle 284 causes the first side plate 260 to pivot relative to the center handle plate 258.

In use, the tool 240 is installed into a pipeline 30 through a pressure housing and an access fitting 40. The first and second side plates 260 and 264 are in the folded or pivoted position shown in FIG. 25. This allows the plug assembly 250 to be more easily positioned within the pipeline 30. The cable recess 274 fits over and around the cable 32. The inner and outer tube handles 282 and 284 are then pivoted in opposite directions. Referring to FIGS. 25 and 26, as the inner tube 254 moves clockwise and the outer tube 256 moves counterclockwise, the side plates 260 and 264 are moved from the folded position shown in FIG. 25, to the extended and flat position shown in FIG. 26. This causes the circular outside edge 275 of the seal ring 272 to seal against the inside walls of the pipeline 30. In addition, the inside surfaces of the cable recess come into contact with and seal against the cable. With the side plates extended, as shown in FIGS. 26 and 27, flow through the pipeline 30 is stopped. As the seal ring 272 is resilient, it can flex and fold as the side plates pivot.

The tube handles 282 and 284 may be moved sequentially or simultaneously. The tube handles 282 and 284 may be replaced by a single handle and mechanism for simultaneously driving both tubes 254 and 256, with a single hand movement. The tool 240 is removed by reversing the direction of the tube handles 282 and 284, and then pulling the plug assembly 250 back out of the pipeline 30 by manipulating the thrust bar 280 and the handle 252.

The tools shown in FIGS. 11–28 are preferably provided as modifications of existing stopping tools, such as tools available from T. D. Williamson, Inc. Tulsa, Okla., USA. This approach has the benefit of gas industry acceptance and familiarity with the tools and procedures employed. These known tools may be provided with a modified plugging mechanism that provides a seal around the cable or conduit. If deploying the plug fitting around the cable in the pipe becomes difficult, the plug can be fitted on to a pressure housing with a clear viewing port that allows the operator to view the position of the cable conduit, as described in PCT/US/01/31468.

Figures 29, 30, 31, 32, 33:
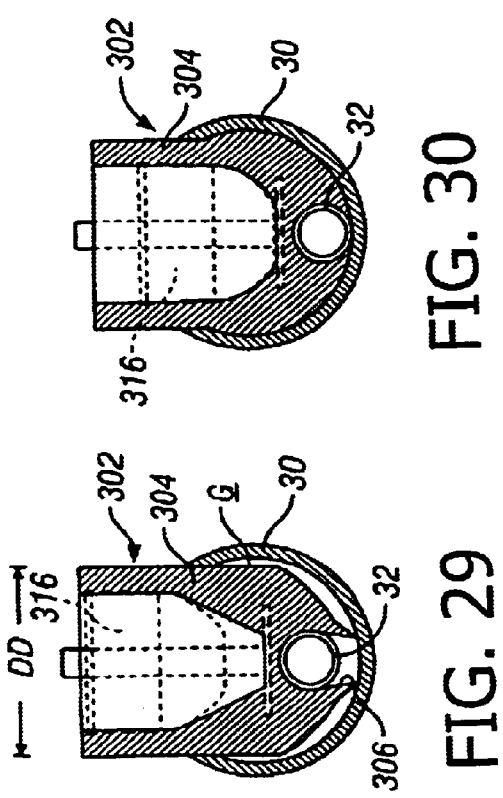
FIG. 29 is a front section view of a stopper assembly of an other tool for use in stopping flow within a pipeline containing a cable, and showing the stopper assembly in an unsealed position.
FIG. 30 is a front view of the tool shown in FIG. 29, in a closed or sealed position.
FIG. 31 is a side view showing installation of the stopper assembly shown in FIGS. 29 and 30.
FIG. 32 is a side view of the plunger shown in FIGS. 29, 30 and 31.
FIG. 33 is a side view of the plug shown in FIGS. 29, 30 and 31.
Figure 34:
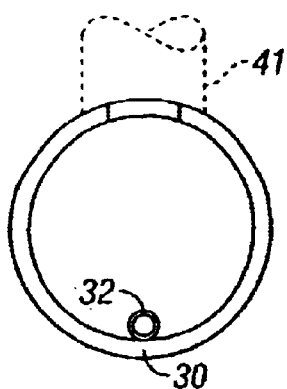
FIG. 34 is section view of a cable in a pipeline having an access opening within a pressure lock housing on the pipeline.

Another stopping or plugging tool 300, as shown in FIGS. 29–33, has a stopper assembly 302 which seals against a cable and pipeline by deformation of a plug 304. The plug 304 is made of a resilient or deformable material, such as rubber. As shown in FIG. 29, lips 306 on the plug 304 extend down around a cable recess 308. A rigid (e.g., metal) drive plate 310 is positioned within the plug 304, at the bottom of a plunger recess 314, and above the conduit recess 308. The plunger recess 314 has an upper or first section 328 having cylindrical sidewalls, and a conical section 330 joining into the cylindrical section 328.

A plunger 316, preferably made of a rigid material, such as metal, preferably has a flat bottom end 326 joining into a curved or hemispherical section 324, and a cylindrical upper section 322. When the plunger 316 is installed into the stopper assembly 302, the cylindrical section 322 of the plunger 316 fits within the cylindrical walls 328 of the plunger recess 314. As shown in FIG. 29, the flat bottom end 326 of the plunger 316 is spaced apart from the drive plate 310. The plug 304 is in its undeformed condition. As shown in FIG. 29, all sections of the plug fit within the diameter DD.

Referring to FIG. 31, in use, the stopper assembly 302 is attached to a plunger drive rod 318. The plunger drive rod 318 is driven up and down into the pipeline 30 by a driver 320. Various types of drivers 320 may be used. The plug tool 300, including the stopper assembly 302, the drive rod 318 and the driver 320 are installed on or in a pressure tight access fitting 40 on the pipeline 30. The stopper assembly is lowered into the pipeline. The cable recess 308 moves down on top of the cable 32, as shown in FIG. 29. In this position, flow continues around the sides of the stopper assembly 302, due to the gaps G between the plug 304 and the inside walls of the pipeline 30. Flow continues as well alongside of the cable 32.

The driver 320 is then actuated forcing the stopper assembly 302 down into the pipeline 30. As this occurs, the plunger 316 moves down within the plug 304, until the plunger comes into contact with the drive plate 310. The plug 304 deforms and changes shape, as shown in FIG. 30. The sides of the plug 304 bulge outwardly and close up the gaps G. Simultaneously, the lips 306 of the plug 304 deform inwardly and close up around the cable 32. As shown in FIG. 30, the pipeline 30 is then entirely plugged, stopping flow through the pipeline. The tool 300 is removed, to allow flow to resume, by reversing the driver 320 causing the plunger 316 to withdraw to the position shown in FIG. 29. The elastic characteristics of the material of the plug 304 cause the plug to return to its original shape, as shown in FIG. 29. The tool 300 can then be pulled up and out of the pipeline 30.

In the tools described above, the cable or conduit opening or recess 192, 274 or 308 is dimensioned to fit over or around the cable in the pipeline. Accordingly, a family or kit of pipe plug or stopper assemblies 164, 240 or 302 may be provided, with each stopper assembly having a different size cable recess. Similarly, since different size plug or stopper assemblies are required for different size pipelines, a family or kit of tools having stopper or plug assemblies of different size may be provided.

The tool shown in FIGS. 29–33 is preferably used with conventional Mueller top half fitting supporting equipment or equivalent, available from Mueller, Co., Decatur, Ill., USA. This approach has the benefit of gas industry acceptance and familiarity with the tools and procedures employed. The use of a modified plugging mechanism provides a seal around the cable or conduit.

In general, the tools shown in FIGS. 11–40 use commercially available equipment to temporarily access the pipe and seal the access when finished. The tools generally can be used without the operator seeing the location of the conduit or cable. If the tool operator desires to view the conduit position, a viewing port in a housing through which the tool is positioned can be used.

Figure 37:
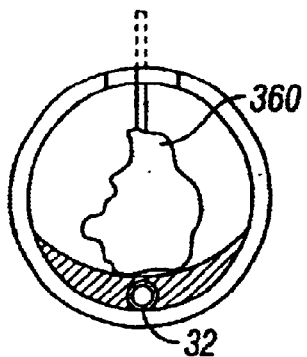
FIG. 37 is a schematic section view of the pipeline of FIG. 36 with a deflated airbag installed in preparation for plugging the pipeline to stop flow.
Figure 38:
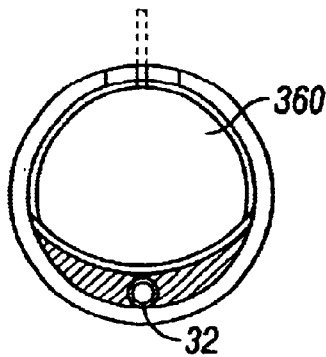
FIG. 38 is a schematic section view of the pipeline of FIG. 36 with the airbag now inflated and plugging the pipeline to stop flow.
Figure 39:
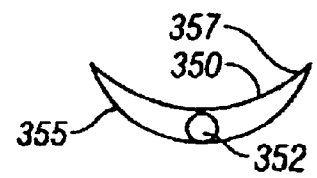
FIG. 39 is front view of the crescent strip shown in FIGS. 35–38.
Figure 40:
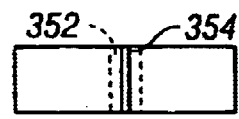
FIG. 40 is bottom view of the crescent strip shown in FIG. 39.

FIGS. 34–40 show sealing or plugging of a pipeline containing a cable, using an inflatable airbag and a crescent strip. As shown in FIGS. 39 and 40, the crescent strip 350 has lips 354 contacting each other below a split cable recess 352. The strip 350 is preferably made of rubber or another flexible material. The outside wall or surface 355 of the strip 350 has a radius selected to match the inside radius R of the pipeline. The inside wall or surface 357 of the strip 350 has a radius T greater than the outside wall radius R.

Figure 35:
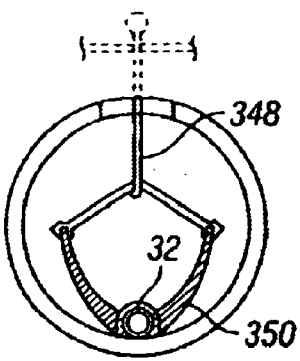
FIG. 35 is a schematic section view of the pipeline of FIG. 34, showing installation of a crescent strip or plate around the cable.
Figure 36:
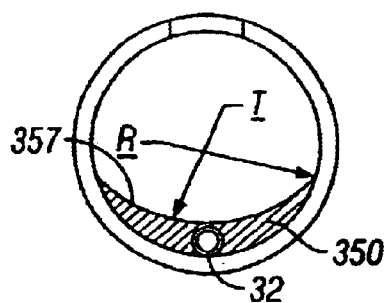
FIG. 36 is section view of the pipeline of FIG. 35 with the crescent strip fully installed.

In use, the crescent strip 350 is installed into the pipeline through a pressure fitting 41 attached around an access opening 42 cut into the pipeline. The crescent strip is lowered into the pipeline on an installation tool 348, which holds the strip in a partially folded position, as shown in FIG. 35. In this position, the lips 354 are pulled apart and the split cable recess 352 is open. The cable recess 352 is lowered onto and around the cable 32. The crescent strip 350 is then released from the installation tool 348 and comes to rest as shown in FIG. 36. The lips 354 close up around and seal to the cable.

Referring now to FIGS. 37 and 38, an airbag 360 is installed into the pipeline above the crescent strip. The airbag 360 is inflated. The crescent strip 350 provides a uniform smoothly curved surface for the inflated airbag to seal against. The inflated airbag pushes out against the inside pipeline walls, and against the crescent strip, thereby closing off the pipeline. To resume flow, the airbag is deflated and removed. The crescent strip is then remove via the tool 348.

Thus, while several embodiments have been shown and described, it will be apparent that various changes and substitutions may be made, without departing from the spirit or scope of the invention. The invention, therefore, should not be limited, except to the following claims, and their equivalents.

What is claimed is:

1. A tool for closing off gas flow in a pipeline containing a conduit or a cable, comprising:

a handle;

a pipe plug assembly attached to the handle, with the pipe plug assembly having a resilient seal ring including an opening in the resilient seal ring; and a linkage on or in the handle for moving the opening in the seal ring from an open position, wherein the opening may be placed around a conduit or a cable in a pipeline, to a closed position, wherein the opening closes around the conduit or cable.

2. A tool for closing off gas flow in a pipeline containing a conduit or a cable, comprising:

a handle;

a seal ring supported directly or indirectly on the handle;

first and second seal lips on the seal ring; and a seal lip drive linkage on the handle and engaged with the seal lips, for moving the seal lips towards and away from each other.

3. The tool of claim 2, wherein the seal lip drive linkage includes first and second jaws engaged with the first and second seal lips, and a clamp rod extending through the handle and linked to the first and second jaws.

4. The tool of claim 3 wherein the seal ring has first and second jaw slots associated with the first and second seal lips, and with the first and second jaws extending into the first and second jaw slots in the seal ring.

5. The tool of claim 2 wherein the seal ring has a tapered cylindrical outer wall, for sealing against an inner wall of a pipeline.

6. A tool for sealing off gas flow in a pipeline containing a conduit or a cable, comprising:

a handle having a first end and a second end;

a plate attached at the second end of the handle;

first and second jaws pivotably attached to the plate;

a seal ring supported by the plate, with the first and second jaws engaging first and second seal lips on the seal ring; and a rod extending from the first end to the second end of the handle, with the rod linked to the first and second jaws.

7. A stopper tool for use in a pipeline containing a cable or conduit, comprising:

a handle having a first end and a second end;

a first plate attached adjacent to the second end of the handle;

a second plate pivotably attached to the first plate;

a linkage on or in the handle and linked to at least one of the first and second plates, to provide for relative pivoting movement between the first and second plates; and a flexible seal ring on the first and second plates, with the flexible seal having a circumferential lower opening adapted to engage around a cable or conduit in a pipeline.

8. The stopper tool of claim 7 wherein a central axis of the handle is parallel to the plane of the first plate.

9. The stopper tool of claim 7 wherein the linkage includes first and second concentric tubes extending through the handle from the first end of the handle to the first and second plates.

10. A stopper tool for use in a pipeline, comprising:

a handle having a first end and second end;

a center plate fixed onto the handle adjacent to the second end of the handle;

a first side plate pivotably attached to a first side of the center plate;

a second side plate pivotably attached to a second side of the center plate;

a first tube extending through the handle, from the first end of the handle to the second end of the handle;

a second tube extending through the first tube and through the handle, from the first end of the handle to the second end of the handle;

a first link pivotably attached to the first tube and to the first side plate;

a second link pivotably attached to the second tube and to the second side plate; and a resilient seal over the center plate and the first and second side plates, and with the resilient seal having a circular lower opening.

11. A pipeline flow stopper tool comprising:

a resilient plug having upper and lower ends;

a first and second plug lips extending through the lower end of the resilient plug;

a plunger opening in the upper end of the resilient plug;

a plunger in the plunger opening; and a plunger driver connected to the plunger.

12. The tool of claim 11 further comprising a drive plate in the plug, with the plunger contacting the drive plate.

13. The tool of claim 11 with the plug lips spaced apart to form a conduit recess between them.

14. The tool of claim 11 wherein the plunger opening has a conical section, and the plunger has a spherical section engaging the conical section.

15. The tool of claim 11 wherein the plug is deformable to seal against an inside wall of a pipeline and to seal around a conduit or cable within the pipeline, when forced into the pipeline by the plunger driver acting on the plunger.

16. The tool of claim 11 wherein the plunger comprises an elastomer.

17. The tool of claim 11 wherein the plunger has a cylindrical outside wall section around the plunger opening, a shoulder section joined to the cylindrical outside wall section, and with the first and second plug lips formed straight and parallel to each other, and joined to the shoulder sections.

18. A method for plugging a pipeline containing a cable or conduit, comprising the steps of:

moving a plug having a recess through an access opening in the pipeline;

positioning the recess in the plug over the cable or conduit in the pipeline, with the recess aligned with the cable or conduit;

forcing the plug into the pipeline with the recess moving over the cable or conduit;

deforming the plug in the pipeline, to engage the plug against the pipeline and to close up the recess in the plug around the cable or conduit.

\* \* \* \* \*